P. DEEVY.
NAIL CLENCHER.
APPLICATION FILED MAR. 12, 1908.
920,834.
Patented May 4, 1909.
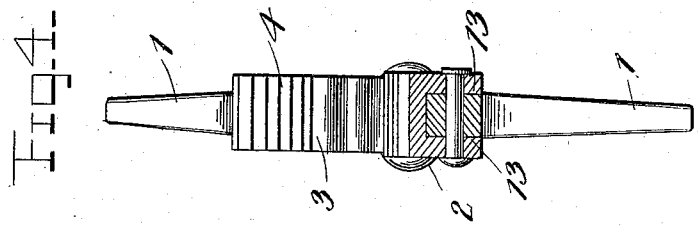
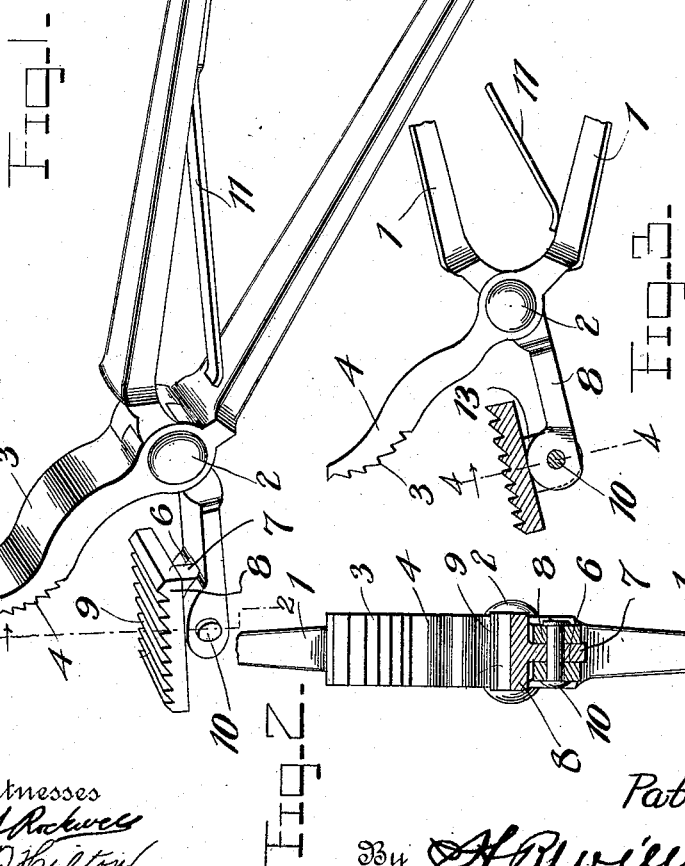
Witnesses
Inventor
Patrick Deevy
By
Attorneys

UNITED STATES PATENT OFFICE.

PATRICK DEEVY, OF MELROSE, IOWA.

NAIL-CLENCHER.

No. 920,834.        Specification of Letters Patent.        Patented May 4, 1909.

Application filed March 12, 1908. Serial No. 420,697.

*To all whom it may concern:*

Be it known that I, PATRICK DEEVY, a citizen of the United States, residing at Melrose, in the county of Monroe and State of Iowa, have invented certain new and useful Improvements in Nail-Clenchers; and I do declare the following to be a full, clear, and exact description of the invention, such as will enable others skilled in the art to which it appertains to make and use the same.

This invention relates to new and useful improvements in nail clenchers, and has for its principal object the production of a simple and easily operated device of this kind by means of which the nails employed for shoeing horses may be readily clenched after the shoeing operation.

A particular feature of the invention resides in providing one of the pivoted handle members with a clamping plate which is pivoted to said handle member and adapted to engage the shoe.

With the foregoing and other objects in view, the invention resides in certain novel features of construction, combination and arrangement of parts as are illustrated in the drawings and particularly pointed out in the appended claims.

In the accompanying drawings, Figure 1 is a perspective view of a device constructed in accordance with the invention; Fig. 2 is a transverse section, taken on the line 2—2 of Fig. 1; Fig. 3 is a fragmentary view showing a slightly modified form of the invention; and Fig. 4 is a cross section taken on the line 4—4 of Fig. 3.

In the embodiment illustrated the device comprises two handle members 1, pivotally connected as at 2, one of the members being extended outwardly at its jaw portion at a suitable angle with the jaw portion of the other arm to form a clencher arm or member 3, the inner face of which is provided at the outer end of said arm with a series of inwardly inclined clencher teeth 4. As shown, the inner portion of the clencher arm is of outwardly curved form and the outer or toothed portion 5 thereof also curved outwardly reversely to the curvature of the inner portion. The jaw portion of the other arm of the device is formed with a longitudinally extending slot 6, adapted for the reception of an outwardly projecting lug or extension 7, produced on the outer face of a flat clamping plate 8, preferably of rectangular form, the inner face of said plate being formed with a series of inclined teeth 9. The lug or extension 7 is pivotally connected in the slotted portion of said last-mentioned handle member by a pivot pin 10, extending through the lug or extension and through the slotted portion of the handle.

In the operation of the device, the clamping plate is placed under the shoe and the handle carrying the clencher arm operated to bring the clencher teeth 4 against the nails to be clenched. This done, the device as a whole may be turned slightly to facilitate in the clenching operation, with the clamping plate in a stationary position and serving as the pivotal point for the device. It has been found advantageous to make the toothed portion of the clencher arm of outwardly curved formation, as shown. A flat spring 11 is attached to one of the handles in position to have its free end engage the other handle at a point adjacent to the pivot end of the latter, the tendency of which is to normally maintain the handles in an open position.

As shown in Figs. 3 and 4, which represent a slightly modified form of the invention, the clamping plate may be provided with two laterally spaced apertured lugs or extensions 13, adapted to straddle the extremity of the jaw portion of said last-mentioned handle member; in which case the slot 7 may be dispensed with.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of the invention as defined in the appended claims.

Having thus described my invention, what I claim as new therein and desire to secure by Letters Patent, is:—

1. A device of the character specified comprising two pivoted handle members, one of which is provided with an outwardly extending clencher arm having a series of inclined clencher teeth and the other of which is formed with a straight flat jaw portion having a longitudinal slot near its outer end, and a straight flat clamping plate having a central lug to extend through the slotted portion of said jaw portion, the outer end wall of said slot constituting a stop to be engaged by the outer edge of said lug to limit outward movement of the clamping plate in a plane substantially parallel with said jaw portion.

2. A device of the character described comprising two pivoted handle members, one of which is provided with a straight jaw portion and the other with a clencher arm having inner outwardly and uniformly and outer inwardly and uniformly curved portions, the inner face of the outer inwardly curved portion having a series of inclined clencher teeth.

In testimony whereof I have hereunto set my hand in presence of two subscribing witnesses.

PATRICK DEEVY.

Witnesses:
  MARK KENWORTHY,
  R. F. PARKS.